(12) United States Patent
Seidel et al.

(10) Patent No.: US 7,186,767 B2
(45) Date of Patent: *Mar. 6, 2007

(54) POLY(ESTER) CARBONATE MOLDING COMPOSITIONS

(75) Inventors: Andreas Seidel, Dormagen (DE); Thomas Eckel, Dormagen (DE); Holger Warth, Dormagen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 35 days.

This patent is subject to a terminal disclaimer.

(21) Appl. No.: 10/725,210

(22) Filed: Dec. 1, 2003

(65) Prior Publication Data

US 2004/0106731 A1 Jun. 3, 2004

(30) Foreign Application Priority Data

Dec. 3, 2002 (DE) ................................ 102 56 316

(51) Int. Cl.
*C08L 69/00* (2006.01)
*C08K 5/521* (2006.01)

(52) U.S. Cl. ................ 524/127; 524/125; 524/126; 524/130; 524/141; 525/67

(58) Field of Classification Search ................ 525/67; 524/122, 127, 130, 141
See application file for complete search history.

(56) References Cited

U.S. PATENT DOCUMENTS

| 4,185,009 | A | * | 1/1980 | Idel et al. | 524/165 |
|---|---|---|---|---|---|
| 4,343,732 | A | * | 8/1982 | Zama et al. | 524/114 |
| 5,068,285 | A | | 11/1991 | Laughner | 525/67 |
| 5,087,663 | A | | 2/1992 | Laughner | 525/67 |
| 5,258,432 | A | * | 11/1993 | Ogoe et al. | 524/141 |
| 5,314,949 | A | * | 5/1994 | Kozakura et al. | 525/67 |
| 5,871,570 | A | * | 2/1999 | Koyama et al. | 106/18.18 |
| 6,423,766 | B1 | * | 7/2002 | Itagaki | 524/127 |
| 6,686,404 | B1 | | 2/2004 | Eckel et al. | 524/127 |
| 6,838,518 | B2 | * | 1/2005 | Seidel et al. | 525/67 |
| 2002/0123567 | A1 | | 9/2002 | Warth et al. | 525/67 |
| 2003/0022989 | A1 | | 1/2003 | Braig et al. | 525/67 |
| 2003/0153658 | A1 | | 8/2003 | Siedel et al. | 524/121 |

FOREIGN PATENT DOCUMENTS

| DE | 31 49 812 | | 7/1983 |
|---|---|---|---|
| EP | 410 221 | | 1/1991 |
| EP | 496 258 | | 7/1992 |
| JP | 50-109247 | | 8/1975 |
| JP | 58-98354 | | 6/1983 |
| JP | 2001226576 | * | 8/2001 |
| WO | 99/57198 | | 11/1999 |

* cited by examiner

*Primary Examiner*—David J. Buttner
(74) *Attorney, Agent, or Firm*—Susan E. Shaw McBee

(57) ABSTRACT

A thermoplastic molding compositions having improved stress cracking resistance is disclosed. The composition contains
A) 40 to 99.5 parts by weight of at least one branched resin selected from a first group consisting of aromatic polycarbonate and polyestercarbonate and
B) 0.5 to 60 parts by weight of graft polymer containing a grafting shell and a grafting base, said grafting base being other than polybutadiene rubber.

The structure of the branched resin contains at least one residue of a branching agent selected from among tri-functional phenolic monomer and tetra-functional phenolic monomer.

17 Claims, No Drawings

POLY(ESTER) CARBONATE MOLDING COMPOSITIONS

FIELD OF THE INVENTION

The invention relates to thermoplastic molding compositions and more particularly to compositions containing branched poly(ester)carbonate

SUMMARY OF THE INVENTION

A thermoplastic molding compositions having improved stress cracking resistance is disclosed. The composition contains
A) 40 to 99.5 parts by weight of at least one branched resin selected from a first group consisting of aromatic polycarbonate and polyestercarbonate and
B) 0.5 to 60 parts by weight of graft polymer containing a grafting shell and a grafting base, said grafting base being other than polybutadiene rubber.

The structure of the branched resin contains at least one residue of a branching agent selected from among tri-functional phenolic monomer and tetra-functional phenolic monomer.

BACKGROUND OF THE INVENTION

The molding compositions disclosed in WO 99/57198 contain aromatic polycarbonates, rubber-modified graft copolymers and phosphorus-containing flame-retardants with the proviso that the fluorine content of the mix does not exceed 0.1 wt. %. Both linear and branched polymers may be used as the polycarbonate component in the compositions disclosed here. Particular advantages resulting from the use of branched types, in particular in combination with butadiene-free graft polymers, are not disclosed.

DE-A 3 149 812 discloses thermoplastic molding compositions with improved processability, which contain branched polycarbonates based on tetracarboxylic acid dianhydrides as the branching agent and graft polymers of the ABS, AES and ASA types. Advantages of ASA- and AES-containing compositions in comparison with the equivalent ABS-containing formulations are not disclosed.

EP-A 496 258 discloses compositions containing polycarbonate branched with special triphenolic compounds and other polymer components such as for example styrene resins, polyamide, polyolefins and rubber-type elastomers. EP-A 496 258 aims to provide polycarbonate compositions with good melt flowability, solvent-resistance and toughness.

U.S. Pat. No. 5,087,663 and U.S. Pat. No. 5,068,285 disclose branched polycarbonates or mixtures thereof containing linear polycarbonates in mixture with ABS or ASA polymers and MBS polymers, which have good blow-molding and thermoforming behavior.

JP-A 50 109 247 and JP-A 58 098 354 disclose polycarbonate blends containing AES, which contain liquid paraffin oil or plasticising additives as a further component. Special advantages resulting from the use of branched polycarbonate are not disclosed in this application.

The object of the present invention was to provide compositions with improved stress cracking resistance under the influence of chemicals. In particular, the invention relates also to flame-resistant compositions containing halogen-free flame-retarding additives.

DETAILED DESCRIPTION OF THE INVENTION

Surprisingly, it was found that molding compositions consisting of special branched polycarbonate and emulsion graft polymers, which are not based on polybutadiene rubber as the grafting base, have better stress-cracking resistance under the influence of chemicals than comparable molding compositions containing linear polycarbonate. This was particularly surprising as compositions of branched polycarbonate and emulsion graft polymers based on polybutadiene rubbers (ABS) were found to have lower stress-cracking resistance under the influence of chemicals than comparable compositions containing linear polycarbonate.

The compositions according to the invention are weather-resistant and are highly suitable in particular for processing in the extrusion, deep-drawing and blow-molding processes.

The invention relates to compositions containing
A) 40 to 99.5 parts by weight, preferably 50 to 99 parts by weight, in particular 55 to 98 parts by weight of branched aromatic polycarbonate or polyestercarbonate based on tri-functional or tetra-functional phenolic branching agents, which may also contain amine functionalities as active functional groups, branching being achieved in this case by amide bonds, and
B) 0.5 to 60 parts by weight, preferably 1 to 50 parts by weight, in particular 2 to 45 parts by weight of graft polymer, preferably emulsion graft polymer in particle form, with a grafting base different from polybutadiene rubber.

Preferred molding compositions are those containing halogen-free flame retardants, in particular based on phosphorus-based compounds, preferably based on organic phosphoric acid esters, in particular oligomeric phosphoric acid esters, the phosphorus compounds preferably being used in combination with fluorinated polyolefins.

Component A

Suitable branched aromatic polycarbonates and/or branched aromatic polyestercarbonates according to Component A of the invention are known from the literature or may be produced by methods known from the literature (for the production of aromatic polycarbonates see for example Schnell, "Chemistry and Physics of Polycarbonates", Interscience Publishers, 1964 and DE-AS 1 495 626, DE-A 2 232 877, DE-A 2 703 376, DE-A 2 714 544, DE-A 3 000 610, DE-A 3 832 396; for the production of aromatic polyestercarbonates e.g. DE-A 3 077 934).

Aromatic poly(ester) carbonates are produced e.g. by reacting diphenols with carbonic acid halides, preferably phosgene, and/or with aromatic dicarboxylic acid dihalides, preferably benzene dicarboxylic acid dihalides, by the phase interface process, optionally using chain stoppers, for example monophenols, and using tri-functional or tetra-functional phenolic branching agents, which may also contain amine functionalities as active functional groups, branching being achieved in this case by amide bonds. Triphenols or tetraphenols for example are suitable branching agents, and phenolic branching agents containing at least three functional groups of graduated reactivity suitable for a condensation reaction are also preferred.

Isatinbiscresol is preferred in particular as a branching agent.

The branching agents are used in a quantity of 0.01 to 5 mol. %, preferably 0.02 to 2 mol. %, in particular 0.05 to 1 mol. %, most particularly 0.1 to 0.5 mol. % in relation to the sum of diphenols and branching agents in the poly(ester) carbonate.

Suitable branched polycarbonates according to the invention may also be produced by the known melt polymerisation processes by reacting diphenolic compounds with diphenyl carbonate using the branching agents and chain stoppers mentioned above.

Diphenols for the production of the branched aromatic polycarbonates and/or aromatic polyestercarbonates are preferably those of the formula (I)

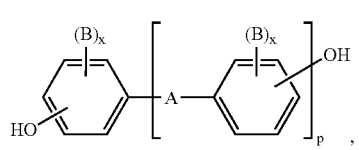

wherein
A is a single bond, $C_1$ to $C_5$-alkylene, $C_2$ to $C_5$-alkylidene, $C_5$ to $C_6$-cycloalkylidiene, —O—, —SO—, —CO—, —S—, —SO$_2$—, $C_6$ to $C_{12}$-arylene, onto which further aromatic rings, optionally containing heteroatoms, may be condensed,
or a group of the formula (II) or (III)

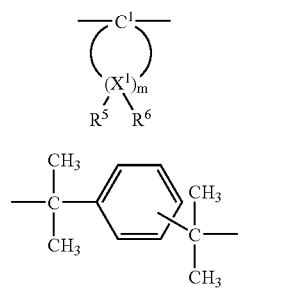

B is, in each case, $C_1$ to $C_{12}$-alkyl, preferably methyl, halogen, preferably chlorine and/or bromine
x in each case, independently of each other, is 0, 1 or 2,
p is 1 or 0, and
$R^5$ and $R^6$ is selected individually for each $X^1$, and independently of each other is hydrogen or $C_1$ to $C_6$-alkyl, preferably hydrogen, methyl or ethyl,
$X^1$ is carbon and
m is an integer from 4 to 7, preferably 4 or 5, provided that $R^5$ and $R^6$ are both alkyl on at least one $X^1$ atom.

Preferred diphenols are hydroquinone, resorcinol, dihydroxydiphenols, bis-(hydroxyphenyl)-$C_1$–$C_5$-alkanes, bis-(hydroxyphenyl)-$C_5$–$C_6$-cycloalkanes, bis-(hydroxyphenyl)-ethers, bis-(hydroxyphenyl)-sulfoxides, bis-(hydroxyphenyl)-ketones, bis-(hydroxyphenyl)-sulfones and, -bis-(hydroxyphenyl)-diisopropyl-benzenes and their ring-brominated and/or ring-chlorinated derivatives.

Particularly preferred diphenols are 4,4'-dihydroxydiphenyl, bisphenol A, 2,4-bis(4-hydroxyphenyl)-2-methylbutane, 1,1-bis-(4-hydroxyphenyl)-cyclohexane, 1,1-bis-(4-hydroxyphenyl)-3,3,5-trimethyl cyclohexane, 4,4'-dihydroxydiphenyl sulfide, 4,4'-dihydroxydiphenyl-sulfone and their di- and tetrabrominated or chlorinated derivatives such as for example 2,2-bis(3-chloro-4-hydroxyphenyl)-propane, 2,2-bis-(3,5-dichloro-4-hydroxyphenyl)-propane or 2,2-bis-(3,5-dibromo-4-hydroxyphenyl)-propane. 2,2-bis-(4-hydroxyphenyl)propane (bisphenol A) is preferred in particular.

The diphenols may be used individually, or in any mixture. The diphenols are known from the literature or may be obtained by processes known from the literature.

Suitable chain stoppers for the production of the thermoplastic, aromatic branched polycarbonates are for example phenol, p-chlorophenol, p-tert.-butyl phenol or 2,4,6-tribromophenol, but also long chain alkyl phenols such as 4-(1,3-tetramethylbutyl)-phenol according to DE-A 2 842 005 or monoalkyl phenol or dialkyl phenols containing a total of 8 to 20 C atoms in the alkyl substitutents such as 3,5-di-tert.-butyl phenol, p-iso-octyl phenol, p-tert. octyl phenol, p-dodecyl phenol and 2-(3,5-dimethylheptyl)-phenol and 4-(3,5-dimethylheptyl)-phenol. The quantity of chain stoppers to be used is generally 0.5 mol. % to 10 mol. %, in relation to the molar sum of the diphenols used in each case.

In addition to the monophenols already mentioned, their chlorocarbonic acid esters and the acid chlorides of aromatic monocarboxylic acids, which may optionally be substituted by $C_1$ to $C_{22}$-alkyl groups or by halogen atoms, as well as aliphatic $C_2$ to $C_{22}$-monocarboxylic acid chlorides are also possible chain stoppers for the production of the aromatic polyestercarbonates.

The quantity of chain stoppers is 0.1 to 10 mol. % in each case, in relation to mols of diphenols in the case of the phenolic chain stopper, and to mols of dicarboxylic acid dichlorides in the case of the monocarboxylic acid chain stopper.

The aromatic polyestercarbonates may also have aromatic hydroxycarboxylic acids incorporated in them.

The proportion of carbonate structural elements in the thermoplastic aromatic polyestercarbonates may be varied at will. The proportion of carbonate groups is preferably up to 100 mol. %, in particular up to 80 mol. %, most preferably up to 50 mol. % in relation to the sum of ester groups and carbonate groups. Both the ester and the carbonate content of the aromatic polyestercarbonates may be present in the form of blocks or distributed at random in the polycondensate.

The thermoplastic, aromatic, branched polycarbonates and polyestercarbonates may be used alone or in any mixture.

The relative solution viscosities of the poly(ester)carbonates suitable according to the invention are in the range 1.20 to 1.50, preferably 1.24 to 1.40, in particular 1.25 to 1.35, measured in $CH_2Cl_2$ as solvent at 25° C. and at a concentration of 0.5 g/100 ml.

Component B

Grafting bases suitable for the graft polymers according to Component B are for example EP(D)M rubbers, i.e. those based on ethylene/propylene, also acrylate-, polyurethane-, silicon-, ethylene/vinylacetate rubbers and silicon-acrylate composite rubbers.

EPDM rubbers, silicon rubbers, acrylate rubbers and silicon-acrylate composite rubbers are preferred.

Silicon-acrylate composite rubbers are preferred in particular.

The grafting bases generally have a median particle size ($d_{50}$ value) of 0.05 to 5 μm, preferably 0.1 to 2 μm, in particular 0.1 to 1 μm.

The median particle size $d_{50}$ is the diameter above and below which 50 wt. % of the particles in each case lie. It may be determined by ultracentrifugal measurement (W. Scholtan, H. Lange, Kolloid, Z. und Z. Polymere 250 (1972), 782–1796).

The gel content of these grafting bases is preferably at least 30 wt. %, in particular at least 40 wt. % (measured in toluene).

The gel content is measured at 25° C. in a suitable solvent (M. Hoffmann, H. Krömer, R. Kuhn, Polymeranalytik I und II, Georg Thieme-Verlag, Stuttgart 1977).

Silicon-acrylate composite rubbers suitable as the grafting base contain 0 to 100 wt. %, preferably 1 to 99 wt. %, in particular 10 to 99 wt. %, most particularly 30 to 99 wt. % polyorganosiloxane component and 100 to 0 wt. %, preferably 99 to 1 wt. %, in particular 90 to 1 wt. %, most particularly 70 to 1 wt. % polyalkyl(meth)acrylate rubber component (the total quantity of the rubber components equalling 100 wt. %).

Preferred silicon-acrylate rubbers used are those for which the production process is disclosed in JP 08 259 791-A, JP 07 316 409-A and EP-A 0 315 035. The content of these applications in this respect is hereby adopted in this application.

The polyorganosiloxane component in the silicon-acrylate composite rubber may be produced by reacting an organosiloxane with a multifunctional crosslinker in an emulsion polymerisation process. Furthermore, it is possible, by adding suitable unsaturated organosiloxanes, to insert graft-active sites into the rubber.

The organosiloxane is generally cyclic, the ring structures preferably containing 3 to 6 Si atoms. Examples of these are hexamethylcyclotrisiloxane, octamethylcyclotetrasiloxane, decamethylcyclopentasiloxane, dodecamethylcyclohexasiloxane, trimethyltriphenylcyclotrisiloxane, tetramethyltetraphenylcyclotetra-siloxane, octaphenylcyclotetrasiloxane, which may be used alone or in a mixture of two or more compounds. The organosiloxane component should account for at least 50 wt. %, preferably at least 70 wt. %, in relation to the silicon content in the silicon-acrylate rubber, of the structure of the silicon content of the silicon acrylate-rubber.

3- or 4-functional silane compounds are generally used as crosslinkers. Particularly preferred examples of these are: trimethoxymethylsilane, triethoxyphenylsilane, tetramethoxysilane, tetraethoxysilane, tetra-n-propoxysilane, tetrabutoxysilane. 4-functional branching agents, in particular tetraethoxysilane. The quantity of branching agent is generally 0 to 30 wt. % (in relation to the polyorganosiloxane component of the silicon-acrylate rubber).

Compounds having one of the following structures are preferably used to incorporate graft-active sites into the polyorganosiloxane component of the silicon-acrylate rubber:

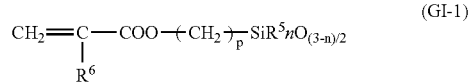
(GI-1)

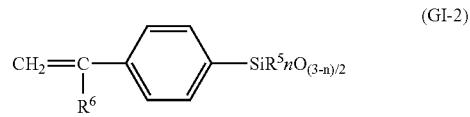
(GI-2)

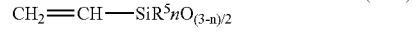
(GI-3)

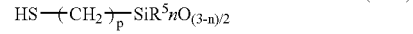
(GI-4)

wherein
$R^5$ means methyl, ethyl, propyl or phenyl,
$R^6$ means hydrogen or methyl,
n means 0, 1 or 2 and
p means a number from 1 to 6.

(Meth)acryloyloxysilane is a preferred compound for the formation of the structure (GI 1). Preferred (meth)acryloyloxysilanes are, for example, methacryloyloxy-ethyl-dimethoxy-methyl-silane, -methacryloyl-oxy-propyl-methoxy-dimethyl-silane, -methacryloyloxypropyl-dimethoxy-methyl-silane, -methacryloyloxypropyl-trimethoxy-silane, -methacryloyloxy-propyl-ethoxy-diethyl-silane, -methacryloyloxypropyl-diethoxy-methyl-silane, -methacryloyloxy-butyl-diethoxy-methyl-silane.

Vinyl siloxanes, in particular tetramethyl-tetravinyl-cyclotetrasiloxane, are capable of forming the structure GI-2.

p-vinylphenyl-dimethoxy-methylsilane, for example, may form structure GI-3. -mercaptopropyldimethoxy-methylsilane, -mercaptopropylmethoxy-dimethylsilane, -mercaptopropyldiethoxymethylsilane etc. may form the structure (GI-4).

The quantity of these compounds is 0 to 10, preferably 0.5 to 5 wt. % (in relation to the polyorganosiloxane component).

The acrylate component in the silicon-acrylate composite rubber may be produced from alkyl (meth)acrylates, crosslinkers and graft-active monomer units.

Examples of preferred alkyl (meth)acrylates are alkyl acrylates such as methylacrylate, ethylacrylate, n-propylacrylate, n-butylacrylate, 2-ethylhexyl acrylate and alkylmethacrylates such as hexyl methacrylate, 2-ethylhexyl methacrylate, n-lauryl methacrylate and, in particular, n-butylacrylate.

Multifunctional compounds are used as crosslinkers. Examples of these are: ethylene glycol dimethacrylate, propylene glycol dimethacrylate, 1,3-butylene glycol dimethacrylate and 1,4-butylene glycol dimethacrylate.

The following compounds, for example, are used, alone or in mixture, for the insertion of graft-active sites: allyl methacrylate, triallyl cyanurate, triallyl isocyanurate, allyl methacrylate. Allyl methacrylate may also function as a crosslinker. These compounds are used in quantities of 0.1 to 20 wt. %, in relation to the acrylate rubber component in the silicon-acrylate composite rubber.

Methods for the production of the silicon-acrylate composite rubbers preferably used in the compositions according to the invention and for grafting these with monomers are disclosed, for example, in U.S. Pat. No. 4,888,388, JP 08 259 791 A2, JP 07 316 409A and EP-A 0 315 035. Both silicon-acrylate composite rubbers in which the silicon and acrylate components form a core-shell structure and those that form a network in which the acrylate and silicon components completely interpenetrate each other (interpenetrating network) are possible grafting bases for the graft polymer B.

Graft polymerisation on the grafting bases described above may be carried out in suspension, dispersion or emulsion. Continuous or discontinuous emulsion polymerisation is preferred. This graft polymerisation is carried out with radical initiators (e.g peroxides, azo compounds, hydroperoxides, persulfates, perphosphates) and optionally using anionic emulsifiers, e.g. carboxonium salts, sulfonic acid salts or organic sulfates. This forms graft polymers with high grafting yields, i.e. a large proportion of the polymer of the graft monomers is chemically bonded to the rubber.

Mixtures of
50 to 99 parts by weight vinyl aromatics and/or core-substituted vinylaromatics (such as for example styrene, α-methylstyrene, p-methylstyrene, p-chlorostyrene) and/or methacrylic acid-($C_1$–$C_8$)-alkyl esters (such as methyl methacrylate, ethyl methacrylate) and 1 to 50 parts by weight vinyl cyanides (unsaturated nitriles such as acrylonitrile and methacrylonitrile) and/or (meth)acrylic acid-($C_1$–$C_8$)-alkyl esters (such as methyl methacrylate, n-butylacrylate, tert.-butylacrylate) and/or derivatives (such as anhydrides and imides) of unsaturated carboxylic acids (for example maleic acid anhydride and N-phenyl maleic imide).

are preferred for the construction of the grafting shell of graft polymers B.

Preferred monomers are styrene, α-methylstyrene, methyl methacrylate, acrylonitrile and maleic acid anhydride. Mixtures of styrene and acrylonitrile as well as methyl methacrylate are particularly preferred as monomers for grafting.

Component B may contain free i.e. un-grafted (co)polymers of optionally core-substituted vinyl aromatics, (meth) acrylic acid-($C_1$–$C_8$)-alkyl esters, vinyl cyanides and/or derivatives of unsaturated carboxylic acids. It is formed either during the grafting reaction itself, or produced in a separate polymerisation step and mixed with the product of graft polymerisation, this mixing taking place either in a pre-compounding step or during compounding of the whole composition.

Component C

The polymer compositions according to the invention may be equipped with halogen-free flame retardants. Flame-retardants based on phosphorus, silicon, nitrogen and/or sulfur compounds are particularly suitable for this.

Phosphorus compounds are preferred as flame-retardants, in particular phosphoric and phosphonic acid esters, phosphazenes, phosphoramidates and phosphonate amines.

Oligomeric phosphoric or phosphonic acid esters of the general formula (IV)

$$R^1-(O)_n-\overset{\overset{O}{\|}}{\underset{\underset{R^2}{|}}{\underset{(O)_n}{P}}}-\left[O-X-O-\overset{\overset{O}{\|}}{\underset{\underset{R^3}{|}}{\underset{(O)_n}{P}}}\right]_q-(O)_n-R^4 \quad (IV)$$

in which
$R^1$, $R^2$, $R^3$ and $R^4$, independently of each other mean, in each case, $C_1$ to $C_8$-alkyl, $C_5$ to $C_6$-cycloalkyl, in each case optionally substituted by alkyl, preferably $C_1$ to $C_4$-alkyl, $C_6$ to $C_{20}$-aryl or $C_7$ to $C_{12}$-aralkyl,
n independently of each other means 0 or 1
q means 0.5 to 30 and
X means a mono- or polynuclear aromatic group having 6 to 30 C atoms, or a linear or branched aliphatic group having 2 to 30 C atoms, which may be OH-substituted and may contain up to 8 ether bonds, are preferred in particular as FR additives.
$R^1$, $R^2$, $R^3$ and $R^4$, independently of each other, preferably represent $C_1$ to $C_4$-alkyl, phenyl, naphthyl or phenyl-$C_1$–$C_4$-alkyl. The aromatic groups $R^1$, $R^2$, $R^3$ and $R^4$ may themselves be substituted with alkyl groups, preferably $C_1$ to $C_4$-alkyl. Particularly preferred aryl groups are cresyl, phenyl, xylenyl, propylphenyl or butylphenyl.

X in formula (IV) preferably means a mono- or polynuclear aromatic group having 6 to 30 C atoms. This is preferably derived from diphenols of formula (I).

n in formula (IV) may be, independently of each other, 0 or 1; n preferably equals 1.

q represents values of 0.5 to 30, preferably 0.8 to 15, particularly preferably 1 to 5, in particular 1 to 2.

X preferably represents a member selected from the group consisting of

[structural formulas]

in particular, X is derived from resorcinol, hydroquinone, bisphenol A or diphenylphenol. X is derived particularly preferably from bisphenol A.

[structural formula]

Other preferred phosphatic compounds are compounds of formula (IVa)

$$R^1-(O)_n-\overset{\overset{O}{\|}}{\underset{\underset{R^2}{|}}{\underset{(O)_n}{P}}}-\left[O-\underset{}{\underset{}{\bigcirc}}\overset{(R^5)_m}{}-Y-\underset{}{\underset{}{\bigcirc}}\overset{(R^6)_m}{}-O-\overset{\overset{O}{\|}}{\underset{\underset{R^3}{|}}{\underset{(O)_n}{P}}}\right]_q-(O)_n-R^4 \quad (IVa)$$

wherein
$R^1$, $R^2$, $R^3$, $R^4$, n and q have the meaning given in formula (IV),
m independently of each other means 0, 1, 2, 3 or 4,
$R^5$ and $R^6$, independently of each other, mean $C_1$ to $C_4$-alkyl, preferably methyl or ethyl and Y means $C_1$ to $C_7$-alkylidene, $C_1$–$C_7$-alkylene, $C_5$ to $C_{12}$-cycloalkylene, $C_5$ to $C_{12}$-cycloalkylidene, —O—, —S—, —$SO_2$— or —CO—, preferably isopropylidene or methylene.

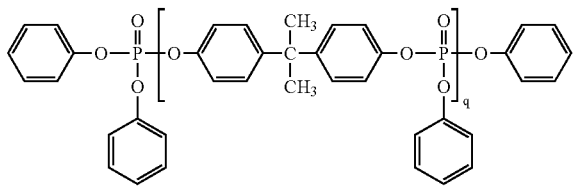

where q=1 to 2, is preferred in particular.

The phosphorus compounds according to Component C are known (cf. e.g. EP-A 0 363 608, EP-A 0 640 655) or may be produced in the same way by known methods (e.g. Ullmanns Enzyklopädie der technischen Chemie, Vol 18, p. 301 ff. 1979; Houben-Weyl, Methoden der organischen Chemie, Vol. 12/1, p. 43; Beilstein Vol. 6, p. 177).

The average q values may be determined by measuring the composition of the phosphate mixture (molecular weight distribution) by a suitable method (Gas Chromatography (GC), High Pressure Liquid Chromatography (HPLC), Gel Permeation Chromatography (GPC)) and calculating the mean values for q from these.

The flame-retardants according to Component C are generally used in quantities of up to 40 weight-%, preferably up to 30 weight-%, in particular up to 25 weight-% in relation to 100 parts by weight A+B.

Component D

The flame retardants according to Component C are often used in combination with so-called anti-dripping agents, which reduce the tendency of the material to burning drip-off in the event of a fire. Examples of these are compounds of the substance classes fluorinated polyolefins, silicons and aramide fibers. These may also be used in the compositions according to the invention. Fluorinated polyolefins are preferred as anti-dripping agents.

Fluorinated polyolefins are known and are disclosed for example in EP-A 0 640 655. They are marketed for example under the trademark Teflon®30N by DuPont.

The fluorinated polyolefins may be used either in pure form, or in the form of a coagulated mixture of emulsions of fluorinated polyolefins with emulsions of the graft polymer according to Component B or with an emulsion of a vinyl-monomer based (co)polymer, in particular based on styrene/acrylonitrile or methyl methacrylate, the fluorinated polyolefin being mixed as an emulsion with an emulsion of the graft polymer or copolymer and then coagulated.

Furthermore, the fluorinated polyolefins may be used as a pre-compound with the graft polymer Component B or a copolymer, preferably vinyl-monomer based. The fluorinated polyolefins are mixed as a powder with a powder or granulate of the graft polymer or copolymer and compounded in the melt, generally at temperatures of 200 to 330° C. in conventional units such as internal kneaders, extruders or twin shaft screws.

The fluorinated polyolefins may also be used in the form of a master batch, which is produced by emulsion polymerisation of at least one monoethylenically unsaturated monomer in the presence of an aqueous dispersion of the fluorinated polyolefin. Preferred monomer components are styrene, acrylonitrile, methylmethacrylate and mixtures thereof. After acid precipitation followed by drying, the polymer is used as a flowable powder.

The coagulates, pre-compounds and master batches generally contain 5 to 95 wt. %, preferably 7 to 80 wt. % fluorinated polyolefin solids.

The fluorinated polyolefins are generally used in concentrations of up to 2 weight-%, preferably up to 1 weight-%, in particular up to 0.5 weight-%, in relation to 100 parts by weight of A+B, these quantities being related to the pure fluorinated polyolefin when using a coagulate, pre-compound or master batch.

Component E (other Additives)

The compositions according to the invention may further contain up to 50 weight-%, preferably up to 30 weight-%, in particular up to 15 weight-%, in relation to 100 parts by weight A+B, of other polymers and/or conventional polymer additives.

Examples of other polymers are, in particular, polyesters, preferably aromatic polyesters, in particular polyethylene terephthalates and polybutylene terephthalates, and polymer compounds which, in the event of a fire, are able to have a synergistic effect by promoting the formation of a stable carbon layer. These are preferably polyphenylene oxides and sulfides, epoxides and phenolic resins, novolaks and polyethers.

Possible polymer additives that may be used are heat stabilisers, hydrolysis stabilisers, light stabilisers, flow- and processing auxiliary agents, mold lubricants and mold release agents, UV absorbers, antioxidants, antistatics, preservatives, coupling agents, fillers and reinforcing agents in fiber-, lamina- or particle form (such as glass fibers, carbon fibers, talc, wollastonite and nanoscale inorganic materials), dyes, pigments, nucleation agents, foaming agents, other flame-retarding additives and smoke-reducing agents and also mixtures of the above-mentioned additives.

The compositions according to the invention are produced by mixing the relevant components in the known way and melt compounding and melt extruding them at temperatures of 200° C. to 300° C. in conventional units such as internal kneaders, extruders or twin-shaft screws.

The individual components may be mixed in the known way either successively or simultaneously, and either at about 20° C. (room temperature) or at a higher temperature.

The compositions according to the invention may be used to produce molded parts of any kind. These may be produced, for example, by injection molding, extrusion and blow-molding processes. A further form of processing is the production of molded bodies by deep-drawing from previously produced sheets or films.

The compositions according to the invention are particularly suitable for extrusion, blow-molding and deep-drawing.

The present invention thus also provides a process for the production of the compositions and their use for the production of molded parts as well as the molded parts themselves.

Examples of such molded parts are sheets, profiles, housing components of all kinds e.g. for domestic appliances such as juicers, coffee machines, food mixers; for office equipment such as monitors, printers, copiers; also sheets, tubes, ducting for electrical installations, profiles for the building industry, internal fittings and external applications; parts for the electrotechnical sector such as switches and plugs and internal and external automobile components.

The compositions according to the invention may be used in particular, for example, for the production of the following molded parts:

Internal components for rail vehicles, ships, aircraft, buses and cars, hub caps, casings for electrical equipment containing small transformers, casings for equipment used for the dissemination and transmission of information, cases and linings for medical applications, massage devices and casings for them, toy vehicles for children, wall elements in sheet form, cases for safety equipment, rear spoilers, bodywork parts for motor vehicles, heat-insulated transport containers, devices for holding and caring for small animals, molded parts for sanitary and bathroom fittings, covering grilles for air vents, molded parts for garden sheds and tool sheds, cases for garden tools.

The following examples explain the invention in more detail.

EXAMPLES

The components given in Table 1 and explained briefly below are melt compounded in a ZSK-25 at 260° C. The test bodies are produced in an Arburg 270 E injection molding machine at 260° C.

Components

Component A1

Branched polycarbonate based on bisphenol A with a relative solution viscosity of $\eta_{rel}$=1.31, measured in $CH_2Cl_2$ as the solvent at 25° C. and a concentration of 0.5 g/100 ml, which was branched using 0.3 mol. % isatinbiscresol in relation to the sum of bisphenol A and isatinbiscresol.

Component A2

Linear polycarbonate based on bisphenol A with a relative solution viscosity of $\eta_{rel}$=1.31, measured in $CH_2Cl_2$ as the solvent at 25° C. and a concentration of 0.5 g/100 ml.

Component A3

Branched polycarbonate based on bisphenol A with a relative solution viscosity of $\eta_{rel}$=1.28, measured in $CH_2Cl_2$ as the solvent at 25° C. and a concentration of 0.5 g/100 ml, which was branched using 0.3 mol. % isatinbiscresol in relation to the sum of bisphenol A and isatinbiscresol.

Component A4

Linear polycarbonate based on bisphenol A with a relative solution viscosity of $\eta_{rel}$=1.28, measured in $CH_2Cl_2$ as the solvent at 25° C. and a concentration of 0.5 g/100 ml.

Component B1

Graft polymer consisting of 40 parts by weight of a copolymer of styrene and acrylonitrile in a ratio of 73:27 on 60 parts by weight cross-linked polybutadiene rubber, produced by emulsion polymerisation (median particle diameter $d_{50}$=0.3 μm).

Component B2

Blendex® WX270: EPDM rubber grafted with styrene and acrylonitrile, produced by UMG ABS Ltd., Tokyo, Japan.

Component B3

Metablen® S2001, silicon-butylacrylate composite rubber grafted with methyl methacrylate, produced by Mitsubishi Rayon Co. Ltd., Tokyo, Japan.

Component B4

Styrene/acrylonitrile copolymer with a styrene/acrylonitrile weight ratio of 72:28 and an intrinsic viscosity of 0.55 dl/g (measured in dimethylformamide at 20° C.).

Component C

Bisphenol A-based oligophosphate

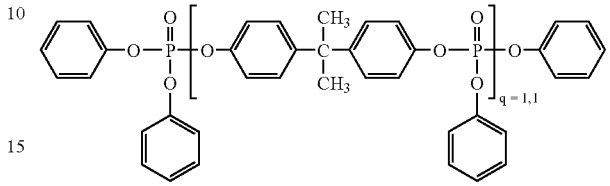

Component D1

Tetrafluoroethylene polymer as a coagulated mixture of an SAN graft polymer emulsion according to the above-mentioned Component B1 in water and a tetrafluoroethylene polymer emulsion in water. The weight ratio of graft polymer B1 to tetrafluoroethylene polymer in the mix is 90 wt. % to 10 wt. %. The tetrafluoroethylene polymer emulsion has a solids content of 60 wt. %, the median particle diameter is 0.05 to 0.5 μm. The SAN graft polymer emulsion has a solids content of 34 wt. % and an median latex particle diameter of $d_{50}$=0.3 μm.

The emulsion of the tetrafluoroethylene polymer (Teflon® 30N) is mixed with the emulsion of the SAN graft polymer and stabilised with 1.8 wt. % in relation to polymer solids of phenolic anti-oxidants. The mixture is coagulated at 85 to 95° C. with an aqueous solution of $MgSO_4$ (Epsom salts) and acetic acid at pH 4 to 5, filtered and washed to remove virtually all of the electrolyte; the majority of the water is then removed by centrifugation and the mixture is dried to a powder at 100° C.

Component D2

Blendex® 449: Teflon master batch consisting of 50 wt. % styrene-acrylonitrile copolymer and 50 wt. % PTFE from GE Specialty Chemicals, Bergen op Zoom (the Netherlands).

Component E1/E2

Pentaerythritol tetrastearate as a mold lubricant/mold release agent (E1) Phosphite stabiliser (E2).

The stress cracking behavior under the influence of chemicals (ESC behavior) is tested on bars measuring 80 mm×10 mm×4 mm, according to ISO 4599. For the flame-resistant compositions, a mixture of 60 vol. % toluene and 40 vol. % isopropanol is used as the test medium. This mixture serves as a model for an aggressive detergent/degreasing agent. For the non-flame-retardant compositions, a mixture of 50 vol. % isooctane and 50 vol. % toluene is used. This mixture serves as a model for a gasoline. The test bodies are pre-strained using an arc-shaped jig and the time to break in each medium is determined as a function of the pre-strain. The minimum pre-strain at which break occurs within 5 minutes is determined.

The combustion behavior was measured to UL-Subj. 94 V on bars measuring 127 mm×12.7 mm×1.5 mm.

A summary of the characteristics of the compositions according to the invention or the test bodies obtained from them is given in Table 1 and Table 2.

TABLE 1

Flame-retardant molding compositions and their characteristics

| | | V1* | 1 | 2 | V2* | V3* | V4* |
|---|---|---|---|---|---|---|---|
| Components [parts by weight] | | | | | | | |
| A1 | PC (branched) | 84.8 | 84.7 | 84.7 | | | |
| A2 | PC (linear) | | | | 84.8 | 84.7 | 84.7 |
| B1 | ABS | 3.5 | | | 3.5 | | |
| B2 | AES | | 4.7 | | | 4.7 | |
| B3 | A(Si + A)S | | | 4.7 | | | 4.7 |
| C | BDP | 10.1 | 10.1 | 10.1 | 10.1 | 10.1 | 10.1 |
| D1 | PTFE master batch | 1.3 | — | — | 1.3 | — | — |
| D2 | PTFE master batch | — | 0.2 | 0.2 | — | 0.2 | 0.2 |
| E1 | PETS | 0.2 | 0.2 | 0.2 | 0.2 | 0.2 | 0.2 |
| E2 | Phosphite stabiliser | 0.1 | 0.1 | 0.1 | 0.1 | 0.1 | 0.1 |
| Graft modifier from B and D | | 4.7 | 4.8 | 4.8 | 4.7 | 4.8 | 4.8 |
| PTFE from D | | 0.1 | 0.1 | 0.1 | 0.1 | 0.1 | 0.1 |
| Characteristics | | | | | | | |
| ESC (Boundary fiber strain in %) | | 1.2 | 2.2 | 2.0 | 1.4 | 1.0 | 1.6 |
| UL94 V score | | V-0 | V-0 | V-0 | V-0 | V-0 | V-0 |

*Reference test

TABLE 2

Non-flame-resistant molding compositions and their characteristics

| | | 3 | 4 | V5* | V6* |
|---|---|---|---|---|---|
| Components [parts by weight] | | | | | |
| A3 | PC (branched) | 56.5 | 56.5 | — | — |
| A4 | PC (linear) | — | — | 56.5 | 56.5 |
| B2 | AES | 24.8 | — | 24.8 | — |
| B3 | A(Si + A)S | — | 24.8 | — | 24.8 |
| B4 | SAN | 17.8 | 17.8 | 17.8 | 17.8 |
| E1 | PETS | 0.7 | 0.7 | 0.7 | 0.7 |
| E2 | Phosphite stabiliser | 0.2 | 0.2 | 0.2 | 0.2 |
| Characteristics | | | | | |
| ESC (boundary fiber strain in %) | | 2.4 | >2.4 | 2.0 | 2.4 |

*Reference test

The examples and reference examples in Tables 1 and 2 show that, irrespective of whether or not the compositions contain flame-retardants, polycarbonate compositions containing butadiene-free graft polymers based on branched polycarbonate have better ESC behavior than equivalent compositions containing linear polycarbonate of the same solution viscosity. With PC+ABS compositions containing polybutadiene rubber-based graft polymer, the reverse behavior is observed, i.e. the ESC behavior is better here when using linear polycarbonate (cf. V1 and V2).

Although the invention has been described in detail in the foregoing for the purpose of illustration, it is to be understood that such detail is solely for that purpose and that variations may be made therein by those skilled in the art without departing from the spirit and scope of the invention except as it may be limited by the claims.

What is claimed is:

1. A thermoplastic molding composition comprising
A) 40 to 99.5 parts by weight of at least one branched resin selected from a first group consisting of aromatic polycarbonate and polyestercarbonate wherein the structure of the branched resin contains at least one residue of a branching agent selected from a second group consisting of tn-functional phenolic monomer and tetra-functional phenolic monomer, said agent containing at least one functional amine group capable of polymerization,
B) 0.5 to 60 parts by weight of graft polymer containing a grafting shell and a grafting base, said grafting base being other than polybutadiene rubber, and
C) at least one halogen-free, phosphorus-based flame-retardant comprising a compound according to formula

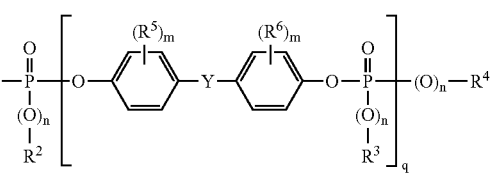

wherein:
R$^1$, R$^2$, R$^3$ and R$^4$, independently of each other mean, in each case, C$_1$ to C$_8$-alkyl, C$_5$ to C$_6$-cycloalkyl, in each case optionally substituted by alkyl;
each n, independently of each other, means 0 or 1;
q is 0.5 to 30;
each m, independently of each other, means 0, 1, 2, 3 or 4;
R$^5$ and R$^6$, independently of each other, are C$_1$ to C$_4$-alkyl; and
Y is C$_1$ to C$_7$-alkylidene, C$_1$–C$_7$-alkylene, C$_5$ to C$_{12}$-cycloalkylene, C$_5$ to C$_{12}$-cycloalkylidene, —O—, —S—, —SO$_2$—or —CO—.

2. The composition of claim 1 wherein R$^1$, R$^2$, R$^3$ and R$^4$ independently of each other is substituted by an alkyl group.

3. The composition according to claim 1, in which B is in particle form and is a product of emulsion polymerization.

4. The composition according to claim 1 in which the grafting base is a member selected from the group consisting of EPDM rubbers, silicon rubbers, acrylate rubbers and silicon-acrylate composite rubbers.

5. The composition according to claim 1, in which the grafting shell contains the polymerized mixture of 50 to 99 parts by weight relative to the grafting shell, of at least one member selected from the first group consisting of vinyl aromatics, core-substituted vinyl aromatics and (meth) acrylic acid-(C$_1$–C$_8$)-alkyl esters and 1 to 50 parts by weight relative to the grafting shell, of at least one member selected from the second group consisting of vinyl cyanides, (meth) acrylic acid-(C$_1$–C$_8$)-alkyl esters and derivatives of unsaturated carboxylic acids with the proviso that said member of said first group differs from said member of said second group.

6. The composition according to claim 1, in which B further contains a free (co)polymer polymerized of at least one member selected from the group consisting of vinyl aromatics, (meth)acrylic acid-(C$_1$–C$_8$)-alkyl esters, vinyl cyanides and derivatives of unsaturated carboxylic acids.

7. The composition according to claim 1, in which the branching agent is isatinbiscresol.

8. The composition according to claim 1, in which the branching agent content of A is 0.01 to 5 mol. % in relation to the sum of diphenols and branching agents.

9. The composition according to claim 1, in which the branching agent content of A is 0.1 to 0.5 mol. % in relation to the sum of diphenol and branching agent.

10. The composition according to claim 1, in which A has a relative solution viscosity of 1.25 to 1.35, measured in $CH_2Cl_2$ as the solvent at 25° C. and at a concentration of 0.5 g/100 ml.

11. The composition according to claim 1, in which q is between 1 and 2.

12. The composition according to claim 1, additionally containing an anti-dripping agent selected from the group consisting of fluorinated polyolefins, silicons and aramide fibers.

13. The composition according to claim 1, in which the flame-retardant is present in a positive quantity of up to 25 parts by weight in relation to the total weight of A and B.

14. The composition according to claim 12 in which the anti-dripping agent is present in a positive quantity of up to 0.5 parts by weight in relation to the total weight of A and B.

15. The composition according to claim 1 additionally containing at least one polymer selected from the group consisting of polyester, polyphenylene oxide, polyphenylene sulfide, epoxide, phenolic resin, novolak and polyether.

16. The composition according to claim 1 additionally containing at least one polymer additive selected from the group consisting of heat-stabilizer, hydrolysis stabilizer, light stabilizer, flow agent, processing auxiliary agent, mold lubricant, mold release agent, UV absorber, antioxidant, antistatic, preservative, coupling agent, filler, reinforcing agent, dye, pigment, nucleation agent, foaming agent, flame-retarding additive and smoke-reducing agent.

17. A molded article comprising the composition of claim 1.

* * * * *